March 19, 1968     G. A. JOHNSON     3,373,894
LOCKING, PRESSURE-RELIEF RADIATOR CAP
Filed Oct. 1, 1965
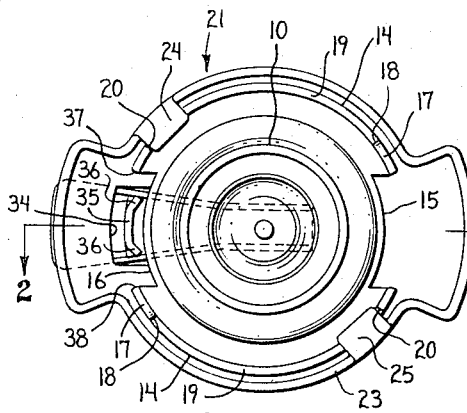
Fig. 1.
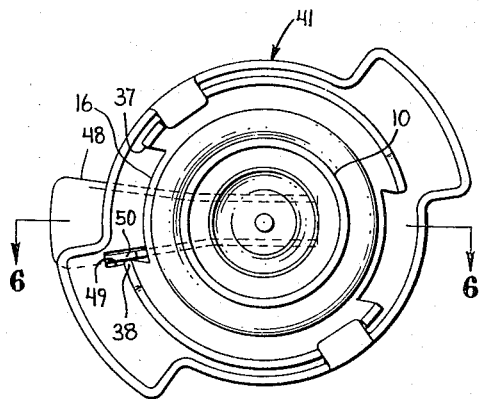
Fig. 5.
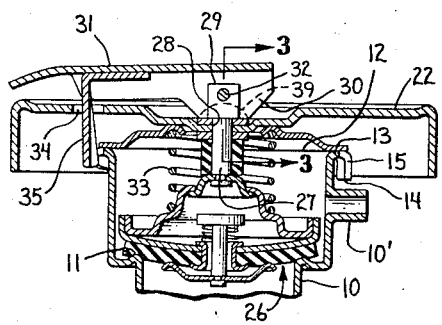
Fig. 2.
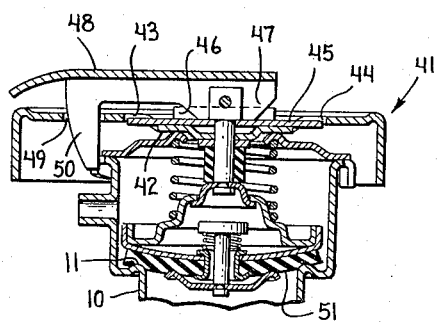
Fig. 6.
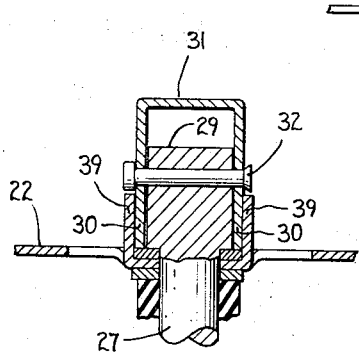
Fig. 3.
Fig. 4.
*INVENTOR.*
GLEN A. JOHNSON
BY *Hood, Gust & Irish*
*Attorneys*

United States Patent Office 3,373,894
Patented Mar. 19, 1968

3,373,894
LOCKING, PRESSURE-RELIEF RADIATOR CAP
Glen A. Johnson, Connersville, Ind., assignor, by mesne assignments, to Stant Manufacturing Company, Inc., a corporation of Delaware
Filed Oct. 1, 1965, Ser. No. 492,041
5 Claims. (Cl. 220—40)

ABSTRACT OF THE DISCLOSURE

A cap for the filler neck of the radiator of the cooling system of an internal combustion engine, said cap including means engageable with a cammed surface associated with such a filler neck to secure said cap in place, a valve which is resiliently held in sealing relation with the mouth of such a filler neck when such means is so engaged, a lever operable while said means is so engaged to lift said valve out of such sealing relation, and means moving with said lever and cooperating with a portion of a conventional filler neck to restrain the cap against movement tending to disengage said first-named means until said lever has been operated so to lift said valve.

---

The present invention relates to a locking, pressure-relief radiator cap, and is primarily directed to the provision of means for protecting motorists, service station attendants and the like against injury resulting from the sudden and careless removal of pressure radiator caps in automobile cooling systems.

Conventionally, the cooling systems of present day automobiles are operated at superatmospheric pressures so that the coolant is maintained at a temperature above the atmospheric boiling point. While it has long been the practice to provide an intermediate dwell position in the securing means for the valved caps which close the filler necks of such systems, the dwell is easily overcome and with amazing frequency persons do remove such caps so quickly and carelessly that hot liquid spews from the filler neck to drench and scald such persons.

The patent to Burdue No. 3,074,588 issued Jan. 22, 1963, discloses means whereby the valve carried by such a pressure cap may be opened to vent the interior of the cooling system to atmosphere through a conventional overflow pipe before the cap is turned at all from its normal, secured position. According to that patent, such means comprises a lever disposed on the outer surface of the cap and operatively connected to the cap-carried valve whereby, when the free end of the lever is lifted, the valve will be moved off its seat to open the interior of the cooling system to atmosphere. Thus, when the lever is so manipulated, the pressure within the cooling system can be reduced to atmospheric value before the cap is even loosened from its seat, thus preventing discharge of coolant through the filler neck onto the operator. It has been found, however, that some persons do not recognize the function of such a vent lever and will carelessly release and remove a closure cap equipped with such safety means without first manipulating the lever, whereby accidents continue to occur.

The primary object of the present invention, then, is to provide means which will positively prevent removal of such a closure until after the lever has been manipulated to vent safely the pressure within the cooling system.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a bottom plan view of a preferred form of closure cap constructed in accordance with the present invention, said cap being shown in fully seated position upon a conventional filler neck illustrated in section;

FIG. 2 is a transverse section taken substantially on the line 2—2 of FIG. 1;

FIG. 3 is a fragmentary section taken substantially on the line 3—3 of FIG. 2;

FIG. 4 is a development of slightly more than one-half of the cammed skirt of a conventional filler neck flange;

FIG. 5 is a view similar to FIG. 1 but illustrating a modified form of the invention; and FIG. 6 is a section taken substantially on the line 6—6 of FIG. 5.

Referring more particularly to FIGS. 1–4, the reference numeral 10 indicates generally a conventional filler neck formed to provide an internal seat 11 facing outwardly toward the mouth 12 of said filler neck which is peripherally bounded by a flange 13 having a downturned skirt 14. Said flange 13 is formed with diametrically opposite radially-opening notches 15 and 16. As is most clearly shown in FIG. 4, the lower surface of the skirt 14 is inclined downwardly or inwardly as at 17 adjacent one boundary of the notch 15, is then formed with a sharp outward declivity 18 and then inclines inwardly as at 19 until it reaches a stop 20 which is conventionally located immediately adjacent the notch 16. The lower edge of the skirt 14 is correspondingly formed as it retreats in a similar direction from the notch 16.

A pressure closure cap assembly is indicated generally by the reference numeral 21 and comprises a body 22 adapted to span the filler neck mouth 12 and formed with a peripheral, depending skirt 23. At diametrically opposite points on its lower edge, the skirt 23 is formed to provide radial fingers 24 and 25 proportioned, designed and arranged to be axially enterable through the notches 15 and 16, respectively. It will be seen that, when said fingers are so entered through those notches and when the cap is turned in a clockwise direction as viewed from above, the fingers 24 and 25 will ride downwardly over the inclines 17 until they pass the declivities 18 and then will ride down the inclines 19 until they are arrested by the stops 20, whereby the cap will be drawn downwardly relative to the filler neck 10 and will be securely held in place thereon.

Valve means indicated generally by the reference numeral 26 is dependently supported from the cap body 22 in such a fashion that, when the cap is so seated, the valve means will normally be pressed against the seat 11 in closing relation thereto. A stem 27 has one end operatively connected to the valve means 26, extends through an opening 28 in the cap body 22 and has its upper end 29 received and embraced between the downturned arms 30 of a lever 31 which is of inverted U-shape in transverse section. A pivot pin 32 penetrates the stem end 29 and the lever arms 30 to provide a pivoted, operative connection between the valve means 26 and the lever 31. A coiled spring 33 is confined between the cap body 22 and the valve means 26, yieldably to urge the valve means into closing engagement with the seat 11. However, when the distal end of the lever 31 is lifted, the proximal end of said lever is so shaped that the pin 32, and therefore the valve means 26, will be moved toward the cap body 22 against the tendency of the spring 33 to vent the interior of the cooling system to atmosphere through the vent port 10'.

The structure as thus far described is substantially identical with that disclosed in the above identified Burdue Patent No. 3,074,588. According to the present invention, the cap body 22 is formed with an aperture 34 at a suitable point such that, when the finger 25 engages the stop 20, the aperture 34 registers with the notch 16 through which the finger 25 has been entered. The lever 31 is provided with a depending toe 35 so proportioned and designed that, when the cap is fully seated on the filler neck 10 and the lever 31 is in the illustrated position in which the valve 26 is pressed by the spring 33 into closing relation with the seat 11, the toe 35 will protrude through the aperture 34 and into the notch 16 between the opposite ends 37 and 38 of said notch.

Means is provided in the cap assembly affirmatively to hold the lever 31 against rotational movement, relative to the axis of said cap body. In the form of invention illustrated in FIGS. 1–4, that means consists of a pair of ears 39, 39, slashed from the cap body and upturned into parallel relationship snugly embracing the parallel arms 30 of the U-shaped lever 31. Thus, when the parts are in the illustrated positions, it will be apparent that the cap asssembly 21 cannot be turned in the direction indicated by the arrow in FIG. 1 to any significant degree, because the toe 35 will engage the slot end 37 affirmatively to arrest such turning movement. Thus, elevation of the distal end of the lever 31 sufficiently to lift the lower end of the toe 35 above the level of the flange 13 is necessary before the cap assembly can be removed from the filler neck; and such elevation of the lever end is sufficient to lift the valve 26 off its seat 11 to vent the interior of the cooling system to atmosphere while the cap assembly is still firmly held in closing position relative to the mouth 12 of said filler neck.

In the form of invention illustrated in FIGS. 1–4, the aperture 34 is peripherally elongated and the toe 53 has a peripheral dimension which significantly exceeds its radial dimension. Additionally, the opposite peripheral edges, 36, 36 of the toe 35 are inclined radially inwardly, as is most clearly illustrated in FIG. 1, whereby the toe 35 is stiffened to resist any force which may be manually impressed upon the cap assembly tending to turn the same relative to the filler neck when the toe 35 is engaged in the notch 16.

As has been stated, in the embodiment of the invention shown in FIGS. 1 and 2, the aperature 34 registers with, and the toe 35 is operably disposed in, the notch 16 through which the finger 25 in enterable. It will be apparent, however, the equivalent results would be achieved if the aperture 34 and the toe 35 were arranged to register, instead, with the notch 15 through which the finger 24 is enterable.

The form of invention illustrated in FIGS. 5 and 6, differs from the form heretofore described only in the specific character of the retaining toe and of the means for restraining the lever against turning movement relative to the cap body. In the form of FIGS. 5 and 6, the cap body, indicated generally by the reference numeral 41 is formed to provide a central depressed region 42 and is slotted as at 43 and 44 at diametrically opposite points in the periphery of the depressed region to receive the opposite ends of a rectangular plate 45 provided with upturned, parallel ears 46, 46, which snugly embrace the downturned arms 47, 47 of the U-shaped lever 48. At a suitable point, the cap body 41 is formed with an aperture 49 through which protrudes, when the lever 48 is in its illustrated postion, a toe 50 which, in this instance, is integrally formed on one of the lever arms 47. In this form of the invention, the aperture 49 is radially elongated and the radial dimension of the toe 50 significantly exceeds its peripheral dimension.

As in the previously-described form, the aperature 49 is so located, and the lever 48 is so oriented, that when the cap assembly 41 is fully seated on the filler neck 10 and the lever 48 is in its illustrated postion wherein the valve 51 is pressed against the seat 11, the toe 50 will be disposed in the notch 16 between the ends 37 and 38 thereof affirmatively to prevent such turning movement of the cap assembly as will release it from the filler neck.

I claim as my invention:

1. The combination with a pressure receptacle having a filler neck formed to provide an internal, axially outwardly-facing seat and further formed to provide a mouth having a radially extending perimetral flange formed with a pair of diametrically opposed, radially outwardly opening notches, the axially inner surface of said flange being inclined axially inwardly as it progresses peripherally from each notch in one direction toward the other notch, being then formed to provide an acute axially outward declivity, and thence inclining axially inwardly toward a stop disposed immediately adjacent said other notch, of a closure cap assembly comprising a cap body adapted to span said mouth, said cap having a pair of diametrically opposite radially inwardly extending fingers enterable axially through said notches and engageable, upon subsequent turning movement of said cap body about its own axis, with the axially inwardly facing surface of said flange, valve means depending from the axially inner surface of said cap body for closing engagement with said seat when said fingers so engage said axially inwardly facing flange surface, spring means confined between said cap body and said valve means and yieldably resisting movement of said valve means toward said cap body, a lever operatively connected to said valve means, said lever being disposed adjacent the axially outer surface of said cap body and being movable between a first position and second position to shift said valve means, against the tendency of said spring means, toward said cap body, said cap body being formed with an aperture registering, when said fingers abut said stops, with said notch, a toe carried by said lever to extend, when said lever is in its first position and said fingers so abut said stops, through said aperture and into one of said notches, and cooperating means on said cap body and said lever to retain said lever against rotational movement relative to said cap body about said axis.

2. The combination of claim 1 in which said cooperating means comprises a pair of spaced, parallel ears fixedly extending axially outwardly from the axially outer surface of said cap body and snugly embracing a portion of said lever throughout movement of said lever between its first and second positions.

3. The combination with a pressure receptacle having a filler neck formed to provide an internal, axially outwardly-facing seat and further formed to provide a mouth having a perimetral flange formed with a radially outwardly opening notch, of a closure cap assembly comprising a cap body adapted to span said mouth, a finger enterable axially through said notch and engageable, upon subsequent turning movement of said cap body about its own axis, with the axially inwardly facing surface of said flange, valve means depending from the inner surface of said cap body for closing engagement with said seat when said finger so engages said axially inwardly facing flange surface, spring means confined between said cap body and said valve means and yieldably resisting movement of said valve means toward said cap body, a lever operatively connected to said valve means, said lever being disposed adjacent the outer surface of said cap body and being movable between a first position and a second position to shift said valve means, against the tendency of said spring means, toward said cap body, said cap body being formed with an aperture registering, when said finger is engaged with said axially inwardly facing flange surface, with said notch, a toe carried by said lever to extend, when said lever is in its first position and said finger is so engaged with said flange surface, through said aperture and into said notch, and cooperating means on said cap body and said lever to retain said lever against rotational movement relative to said cap body about said axis, said aperture being peripherally elongated, the peripheral dimension of said toe significantly exceeding its radial dimension, and the opposite peripheral edges of said toe being inclined radially inwardly.

4. The combination with a pressure receptacle having a filler neck formed to provide an internal, axially outwardly facing seat and further formed to provide a mouth having a perimetral flange formed with a radially outwardly opening notch, a closure cap assembly comprising a cap body adapted to span said mouth, a finger enterable axially through said notch and engageable, upon subsequent turning movement of said cap body about its own axis, with the axially inwardly facing surface of said flange, valve means depending from the inner surface of said cap body for closing engagement with said seat when said finger so engages said axially inwardly facing flange surface, spring means confined between said cap body and said valve means and yieldably resisting movement of said valve means toward said cap body, a lever operatively connected to said valve means, said lever being disposed adjacent the outer surface of said cap body and being movable between a first position and a second position to shift said valve means, against the tendency of said spring means, toward said cap body, said cap body being formed with an aperture registering, when said finger is engaged with said axially inwardly facing flange surface, with said notch, a toe carried by said lever to extend, when said lever is in its first position and said finger is so engaged with said flange surface, through said aperture and into said notch, and cooperating means on said cap body and said lever to retain said lever against rotational movement relative to said cap body about said axis, the axially inwardly facing surface of said flange being inclined axially inwardly as it retreats peripherally from said notch, then being formed with an acute axially outward declivity and thence inclining axially inwardly to a stop, and said toe is so peripherally related to said finger that said finger cannot move significantly away from said stop toward said notch until said toe is withdrawn from said notch by movement of said lever to its second position.

5. An automobile radiator cap for use with a conventional radiator filler neck formed to provide an internal, axially outwardly facing seat and further formed to provide a mouth having a radially extending, perimetral flange formed with a pair of diametrically opposed, radially outwardly opening notches, the axially inner surface of said flange having a portion which is inclined axially inwardly as it progresses peripherally away from each notch in one direction toward a stop disposed immediately adjacent the other notch: said cap comprising a cap body having an axially depending peripheral skirt, a pair of diametrically opposite fingers extending radially inwardly from the distal edge of said skirt, valve means depending from the axially inner surface of said cap body to a level axially inwardly beyond said fingers, spring means confined between said cap body and said valve means and yieldably resisting movement of said valve means toward said cap body, said fingers being enterable simultaneously through such notches and then being respectively engageable with the inclined portions of such axially inner flange surface upon turning movement of said cap about its own axis to press said valve means sealingly against such seat and compress said spring means when said fingers abut such stops respectively, a lever operatively connected to said valve means, said lever being disposed adjacent the axially outer surface of said cap body and being movable between a first position and a second position to shift said valve means, against the tendency of said spring means, away from such seat when said fingers are in abutment with such stops, the distal end of said lever extending radially outwardly beyond a circle which is centered on the axis of said cap body and which intersects the distal portions of said fingers, said cap body being formed with an aperture therethrough disposed on said circle and registering with one of such notches when said fingers are caused to abut such stops, a toe carried by said lever substantially at the point of intersection of said lever with said circle and extending through said aperture and into such one notch when said fingers abut such stops and said lever is in its first position, and cooperating means on said cap body and said lever to retain said lever against movement relative to said cap body out of a position in which its toe registers with said aperture.

References Cited
UNITED STATES PATENTS

| | | | |
|---|---|---|---|
| 3,062,400 | 11/1962 | Humbert | 220—44 |
| 3,074,588 | 1/1963 | Burdue | 220—44 |
| 3,098,636 | 6/1965 | Previte | 220—44 |
| 3,186,580 | 6/1965 | Previte | 220—44 |
| 3,203,578 | 8/1965 | Previte | 220—44 |

THERON E. CONDON, *Primary Examiner.*

JAMES R. GARRETT, *Examiner.*